(12) United States Patent
Laine et al.

(10) Patent No.: US 12,703,369 B2
(45) Date of Patent: Aug. 11, 2026

(54) VEHICLE MOTION MANAGEMENT BASED ON A DYNAMIC TIRE MODEL

(71) Applicant: Volvo Truck Corporation, Gothenburg (SE)

(72) Inventors: Leo Laine, Gothenburg (SE); Leon Henderson, Härryda (SE); Ulf Stenbratt, Vallda (SE); Adithya Arikere, Gothenburg (SE); Mats Rydström, Billdal (SE); Chidambaram Subramanian, Durham, NC (US)

(73) Assignee: Volvo Truck Corporation, Gothenburg (SE)

(*) Notice: Subject to any disclaimer, the term of this patent is extended or adjusted under 35 U.S.C. 154(b) by 396 days.

(21) Appl. No.: 18/285,092

(22) PCT Filed: Apr. 7, 2021

(86) PCT No.: PCT/EP2021/059097
§ 371 (c)(1),
(2) Date: Sep. 29, 2023

(87) PCT Pub. No.: WO2022/214174
PCT Pub. Date: Oct. 13, 2022

(65) Prior Publication Data

US 2024/0182041 A1 Jun. 6, 2024

(51) Int. Cl.
*B60W 40/101* (2012.01)
*B60C 23/04* (2006.01)
(Continued)

(52) U.S. Cl.
CPC ....... *B60W 40/101* (2013.01); *B60C 23/0488* (2013.01); *B60C 99/006* (2013.01);
(Continued)

(58) Field of Classification Search
CPC ....... B60W 40/1101; B60W 30/18172; B60W 40/1005; B60C 23/0488; B60C 99/006
See application file for complete search history.

(56) References Cited

U.S. PATENT DOCUMENTS 6,692,089 B2 * 2/2004 Kuwajima .......... B60T 8/17616 303/165
8,983,749 B1 3/2015 Singh
(Continued)

FOREIGN PATENT DOCUMENTS

CN 204514617 U * 7/2015 ........... B60C 99/006
CN 108482379 A 9/2018
(Continued)

OTHER PUBLICATIONS

International Search Report and Written Opinion of the Searching Authority, PCT Application No. PCT/EP2021/059097, mailed Nov. 8, 2021, 17 pages.
(Continued)

*Primary Examiner* — Jacob D Knutson
(74) *Attorney, Agent, or Firm* — Sage Patent Group

(57) ABSTRACT

A method for controlling motion of a heavy-duty vehicle, the method including:
- obtaining input data related to one or more parameters of a tire on the heavy-duty vehicle,
- determining at least part of the one or more tire parameters based on the input data,
- configuring a tire model, wherein the tire model defines a relationship between wheel slip and generated wheel force, wherein the tire model is parameterized by the one or more tire parameters, and
- controlling the motion of the heavy-duty vehicle based on the relationship between wheel slip and generated wheel force.

20 Claims, 5 Drawing Sheets

(51) Int. Cl.

| | |
|---|---|
| ***B60C 99/00*** | (2006.01) |
| ***B60W 30/18*** | (2012.01) |
| ***B60W 40/10*** | (2012.01) |

(52) U.S. Cl.

CPC .. *B60W 30/18172* (2013.01); *B60W 40/1005* (2013.01); *B60C 2200/06* (2013.01); *B60W 2300/12* (2013.01); *B60W 2510/18* (2013.01); *B60W 2520/06* (2013.01); *B60W 2520/10* (2013.01); *B60W 2520/20* (2013.01); *B60W 2520/26* (2013.01); *B60W 2520/28* (2013.01); *B60W 2520/30* (2013.01); *B60W 2530/10* (2013.01); *B60W 2530/16* (2013.01); *B60W 2530/20* (2013.01); *B60W 2555/20* (2020.02); *B60W 2556/10* (2020.02); *B60W 2556/50* (2020.02)

(56) References Cited

U.S. PATENT DOCUMENTS

| | | | | |
|---|---|---|---|---|
| 9,340,211 | B1 | 5/2016 | Singh | |
| 2005/0065666 | A1* | 3/2005 | Miyashita | G01M 17/02 73/146 |
| 2006/0253243 | A1 | 11/2006 | Svendenius et al. | |
| 2011/0209521 | A1* | 9/2011 | Shiozawa | B60T 8/172 73/9 |
| 2015/0285712 | A1 | 10/2015 | Singh | |
| 2016/0129894 | A1 | 5/2016 | Singh | |
| 2016/0159365 | A1 | 6/2016 | Singh | |
| 2016/0159367 | A1 | 6/2016 | Singh et al. | |
| 2017/0113495 | A1 | 4/2017 | Singh | |
| 2018/0272813 | A1* | 9/2018 | Singh | B60C 11/243 |
| 2019/0176784 | A1* | 6/2019 | Laine | B60T 8/172 |
| 2020/0172165 | A1 | 6/2020 | Chen et al. | |
| 2020/0189327 | A1 | 6/2020 | Kintscher et al. | |
| 2020/0290577 | A1 | 9/2020 | Berntorp | |
| 2020/0290625 | A1 | 9/2020 | Berntorp et al. | |

FOREIGN PATENT DOCUMENTS

| | | | |
|---|---|---|---|
| CN | 110654386 | A | 1/2020 |
| CN | 111563298 | A | 8/2020 |
| CN | 111688715 | A | 9/2020 |
| CN | 111845774 | A | 10/2020 |
| CN | 111959516 | A | 11/2020 |
| CN | 112124323 | A | 12/2020 |
| GB | 2562308 | A | 11/2018 |
| SE | 201750955 | A1 | 2/2019 |
| WO | 2020249239 | A1 | 12/2020 |

OTHER PUBLICATIONS

International Preliminary Report on Patentability, PCT Application No. PCT/EP2021/059097, mailed Jun. 22, 2023, 28 pages.

Hans Pacejka, “Tyre and Vehicle Dynamics”, Referex, 2012, XP040425353, 621 pages.

* cited by examiner

400

410

CLOUD

430

440

420

TRANSPORT MISSION AND ROUTE PLANNING

VEHICLE ENVIRONMENT

HUMAN MACHINE INTERFACE

370

TRAFFIC SITUATION MANAGEMENT (TSM)

360

VEHICLE MOTION AND POWER MANAGEMENT (VMM)

340

MOTION SUPPORT DEVICE (MSD) MANAGEMENT

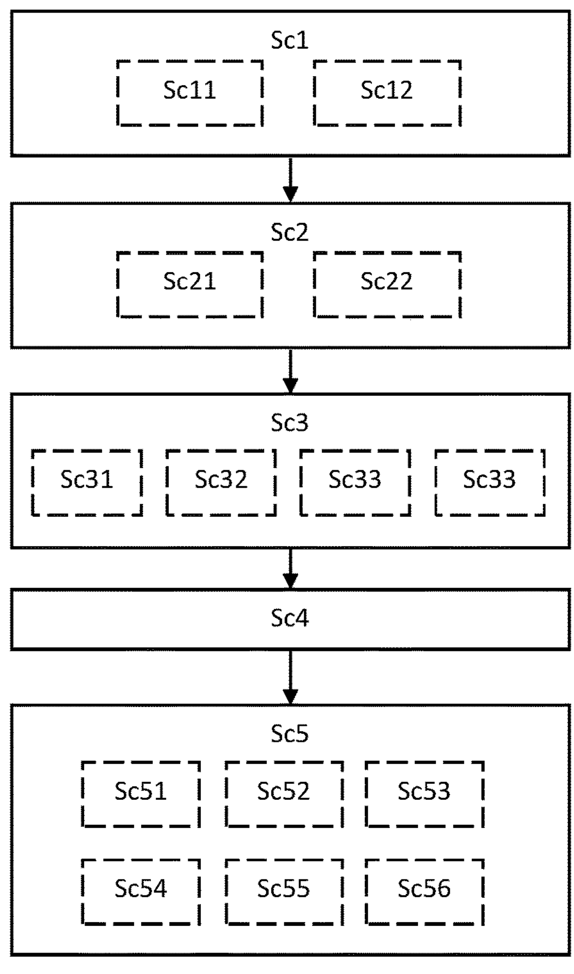
FIG. 6C
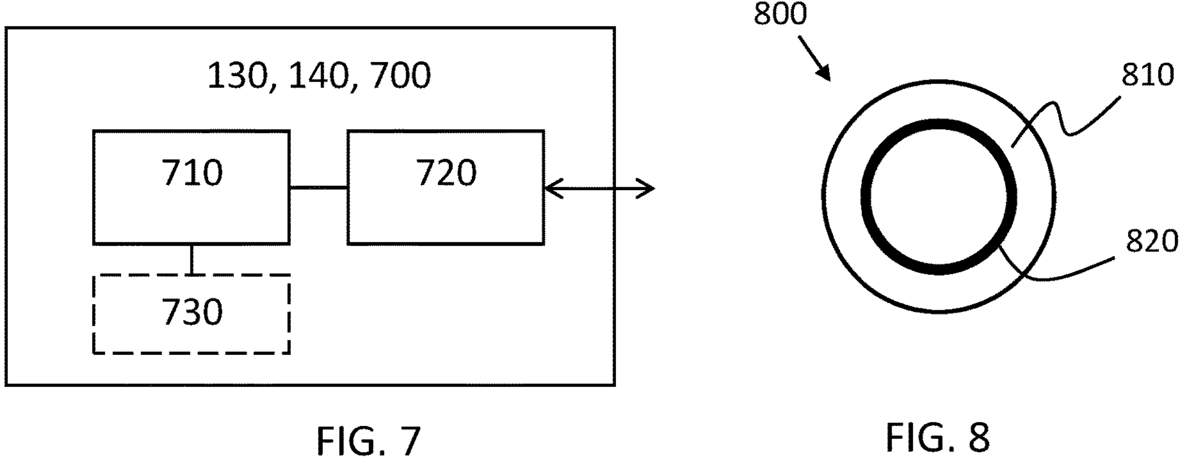
FIG. 7
FIG. 8

VEHICLE MOTION MANAGEMENT BASED ON A DYNAMIC TIRE MODEL

CROSS REFERENCE TO RELATED APPLICATIONS

This application is a 35 U.S.C. § 371 national stage application of PCT International Application No. PCT/EP2021/059097 filed on Apr. 7, 2021, the disclosure and content of which is incorporated by reference herein in its entirety.

TECHNICAL FIELD

The present disclosure relates to methods and control units for ensuring safe and efficient vehicle motion management of a heavy-duty vehicle. The methods are particularly suitable for use with articulated vehicles, such as trucks and semi-trailers comprising a plurality of vehicle units. The disclosed subject matter can, however, also be applied in other types of heavy-duty vehicles, e.g., in construction equipment and mining vehicles.

BACKGROUND

Heavy-duty vehicles, such as trucks and semi-trailer vehicles, are designed to carry heavy loads. The heavily laden vehicles must be able to start from standstill also in uphill conditions, accelerate on various types of road surfaces, and most importantly be able to reduce velocity, i.e., brake, in a controlled and reliable manner at all times. It is also important that the vehicle can be operated in an energy efficient manner without unnecessary component wear. A key property to achieving this functionality are a well-designed set of tires. Thus, much work has gone into developing tires for heavy-duty vehicles, where a well-designed tire provides a combination of high friction and low rolling resistance. A well designed tire also has a low wear rate, i.e., it is mechanically durable and lasts for a long period of time.

Excessive wheel slip occurs when too much torque is applied to an axle or a wheel compared to the road friction. Excessive wheel slip is undesired since it results in an unpredictable vehicle behavior and also in energy inefficient operation.

GB2562308 A discusses wheel slip and proposes methods for limiting a maximum regenerative braking torque which can be applied to a wheel. The controller uses a tire model to determine a maximum usable traction for each wheel and calculates the maximum regenerative braking force to be applied to each wheel based on this tire model.

However, there is a continuing need for further improvements in vehicle motion management in heavy-duty vehicles.

SUMMARY

It is an object of the present disclosure to provide techniques which alleviate or overcome at least some of the above-mentioned problems. This object is at least in part obtained by a method for controlling motion of a heavy-duty vehicle. The method comprises obtaining input data related to one or more parameters of a tire on the heavy-duty vehicle and determining at least part of the one or more tire parameters based on the input data. The method also comprises configuring a tire model, where the tire model defines a relationship between wheel slip and generated wheel force and where the tire model is parameterized by the one or more tire parameters, and controlling the motion of the heavy-duty vehicle based on the relationship between wheel slip and generated wheel force. This way the vehicle control can be based on an accurate and up to date tire model which better reflects the current properties of the tire. This type of wheel slip-based vehicle control has been shown to provide superior performance compared to, e.g., regular torque-based control strategies, and this vehicle control strategy is further improved by the dynamically adapted tire models disclosed herein.

According to aspects, the input data comprises input data from one or more sensors arranged to measure one or more operating parameters of the tire. The sensors can be configured to provide real-time data from the tire, thus enabling a real-time dynamic adaptation of the tire model which quickly reacts to changes in tire properties. Thus, if tire properties change, so will the tire model, which is an advantage.

According to aspects, the one or more operating parameters comprise any of: vehicle speed, wheel rotation speed, tire pressure, tire temperature, tire acceleration, tire strain, tire GPS position, weather, ambient temperature, rain classification data, normal load, slip angle, steer angle, and applied torque. Thus, the tire model is able to adjust to many different operating parameters which is an advantage.

According to aspects, the input data comprises data obtained from memory related to tire design. Different types of tires may have different properties and may react differently to events such as low road friction, high temperatures, rain, and so on. By accounting for the tire design, the model can be made more accurate. The data related to tire design may, e.g., comprise any of: tire nominal dimension, tire structural characteristics, tire chemical composition, tire history.

According to aspects, the one or more estimated tire parameters comprise any of: tire wear, tire longitudinal stiffness, tire lateral stiffness, tire rolling resistance, tire peak friction, tire rolling radius, tire contact patch properties, tire balance properties and wheel alignment properties. It is an advantage to be able to capture all these different tire parameters by the tire model. Having accurate information about one or more of these parameters facilitates efficient and/or safe vehicle control.

According to aspects, the method comprises repeatedly updating at least part of the one or more tire parameters based on updated input data. Thus, the tire model is kept up to date, despite changes in, e.g., operating conditions and tire state.

According to aspects, the tire model is configured to define a relationship between wheel slip and generated wheel force in longitudinal and lateral directions. By not only accounting for longitudinal slip, more advanced vehicle motion management is enabled.

According to aspects, the tire model is configured to model a rolling resistance of the tire. By modelling rolling resistance in dependence of one or more of the tire properties, the vehicle control can be optimized also with respect to rolling resistance, which is an advantage. For instance, a control strategy for completing a maneuver associated with lower rolling resistance can be chosen over one which is associated with higher rolling resistance. Consequently, according to aspects, the method also comprises coordinating one or more motion support devices of the heavy-duty vehicle to reduce a tire rolling resistance under constraints comprising fulfillment of a motion request. According to other aspects, the methods further comprise coordinating one or more motion support devices of the heavy-duty vehicle to increase a travelled range capability of the heavy-duty vehicle.

According to aspects, the tire model is configured to model a wear rate of the tire. By also modelling wear rate in dependence of the tire parameters, the vehicle control functions can be configured to optimize vehicle control such that the tire lasts longer. For instance, the vehicle control can be performed with a target to minimize or at least reduce tire wear. Consequently, according to aspects, the method also comprises coordinating one or more motion support devices of the heavy-duty vehicle to reduce a tire wear rate under constraints comprising fulfillment of a motion request.

According to aspects, the tire model is configured to define a relationship between wheel slip and both propulsion and braking wheel forces. Thus, the tire models disclosed herein may support both acceleration and braking maneuvers, which is an advantage.

According to aspects, the tire model is configured to model a self-aligning torque of the tire. It is an advantage to have a good understanding of the self-aligning torque properties of a tire, since this simplifies vehicle control by removing some behavioral uncertainties which otherwise may lead to control inaccuracy.

According to aspects, the method comprises coordinating one or more motion support devices of the heavy-duty vehicle to reduce a stopping distance of the heavy-duty vehicle. Thus, the tire models disclosed herein can be used to brake more efficiently by predicting a braking force that will be generated by a certain control action. For instance, perhaps one some tires are able to support larger braking forces compared to other tires. More braking torque can then be assigned to these tires compared to other tires which may not be able to support as large braking force, due to, e.g., wear due to aging effects or the like.

There is also disclosed herein control units, computer programs, computer readable media, computer program products, and vehicles associated with the above discussed advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

With reference to the appended drawings, below follows a more detailed description of embodiments of the present disclosure cited as examples. In the drawings:

FIGS. 6A-C are flow charts illustrating example methods;

FIG. 7 schematically illustrates a sensor unit and/or a control unit; and

FIG. 8 shows an example computer program product.

DETAILED DESCRIPTION

Figure 1:
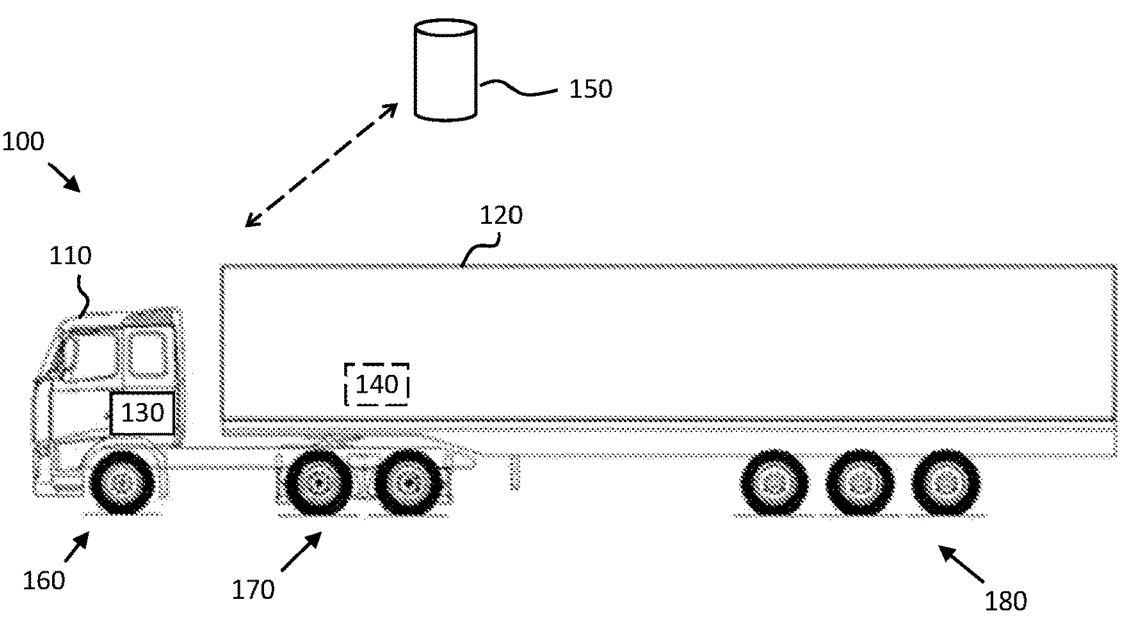
FIG. 1 schematically illustrates a vehicle for cargo transport.

The disclosed subject matter will now be described more fully hereinafter with reference to the accompanying drawings, in which certain aspects of the present disclosure are shown. This disclosure may, however, be embodied in many different forms and should not be construed as limited to the embodiments and aspects set forth herein; rather, these embodiments are provided by way of example so that this disclosure will be thorough and complete, and will fully convey the scope of the disclosed subject matter to those skilled in the art. Like numbers refer to like elements throughout the description.

It is to be understood that the present disclosure is not limited to the embodiments described herein and illustrated in the drawings; rather, the skilled person will recognize that many changes and modifications may be made within the scope of the appended claims.

FIG. 1 illustrates a heavy-duty vehicle 100. This particular example comprises a tractor unit 110 which is arranged to tow a trailer unit 120. The tractor 110 comprises a vehicle control unit (VCU) 130 arranged to control various functions of the vehicle 100. For instance, the VCU may be arranged to perform a vehicle motion management (VMM) function comprising control of wheel slip, vehicle unit stability, and so on. The trailer unit 120 optionally also comprises a VCU 140, which then controls one or more functions on the trailer 120. The VCU or VCUs may be communicatively coupled, e.g., via wireless link, to a remote server 150. This remote server may be arranged to perform various configurations of the ECU, and to provide various forms of data to the ECU 130, such as providing data regarding the make and type of tires mounted on the vehicle 100, as will be discussed in more detail below.

The vehicle combination 100 may of course also comprise additional vehicle units, such as one or more dolly units and more than one trailer unit.

The vehicle 100 is supported by wheels, where each wheel comprises a tire. The tractor unit 110 has front wheels 160 which are normally steered, and rear wheels 170 of which at least one pair are driven wheels. Generally, the rear wheels of the tractor 110 may be mounted on tag or pusher axles. A tag axle is where the rear-most drive axle is non-powered, also referred to as a free-rolling or dead axle. A pusher axle is where the forward-most drive axle is not powered. The trailer unit 120 is supported on trailer wheels 180. Trailers with driven wheels, and even a steered axle, are also possible.

One or more of the rear axles and/or one of the axles on the trailer 120 may be a liftable axle. A lift axle, also known as a retractable axle, is an axle which can be raised so that its tires are not touching the road surface. This improves fuel economy and reduces maintenance and tire wear. It may also reduce or increase dynamic stability features of the vehicle and it can increase or decrease road wear depending on vehicle load, which axles that are lifted and in which driving situation the axle is lifted.

One of the rear axles and/or one of the axles on the trailer 120 may be a liftable axle. A lift axle, also known as a retractable axle, is an axle which can be raised so that its tires are not touching the road surface. This improves fuel economy, and reduces maintenance and tire wear, although it increases road wear. One or more of the wheels may also be mounted with an active suspension which may be controlled by the VCU 130, 140, e.g., in order to adjust a normal force of one or more tires.

The tires on the wheel play a major role in determining the behavior and capabilities of the vehicle 100. A well-designed set of tires will provide both good traction and fuel economy, while a poorly designed set of tires, or overly worn tires, are likely to reduce both traction and fuel economy and may even result in an unstable vehicle combination, which of course is undesired.

The present disclosure relates to software tire models which model tire parameters and tire behaviors, e.g., for a given vehicle state such as a vehicle velocity, normal load, and so on. The tire models can be used with advantage by the VCU to optimize control of the vehicle 100. For example, the tire models disclosed herein may be used to model a relationship between generated wheel force and wheel slip, which relationship then allows the VCU to better control the vehicle by requesting a wheel slip from a torque generating device instead of a direct request for torque. The torque generating device is then able to maintain a much more stable generated wheel force due to a higher bandwidth control loop run locally, i.e., closer to the wheel end. Some example tire models may also be used to estimate a tire wear rate in dependence of a vehicle state, i.e., if a certain vehicle maneuver or operation results in excessive tire wear or not. Further example tire models discussed herein model tire rolling resistance, such that the VCU can optimize vehicle control to reduce tire rolling resistance and thus obtain an increased energy efficiency for a given transport mission or just for a single maneuver. The tire models discussed herein are configured to be dynamically updated as the vehicle is operated. Thus, the tire models are dynamic and not static, which means that the tire models will be able to better and more closely model tire parameters in dependence of, e.g., the overall driving scenario and the state of the tires over time as the tire characteristics change due to wear and variation in inflation pressure and temperature.

Some important properties and characteristic parameters of a tire will now be discussed. These tire parameters are optionally comprised in the tire model, either as tire parameters from which other capabilities and characteristics of the tire can be determined by the VCU 130, 140, or simply as tire characteristics which can be used more or less directly by the VCU 130, 140 to optimize various control decisions.

A tire rotating at higher speeds tends to develop a larger diameter, i.e., a larger rolling radius, due to centrifugal forces that force the tread rubber away from the axis of rotation. This effect is often referred to as centrifugal growth. As the tire diameter grows, the tire width decreases. Excessive centrifugal growth may significantly impact the behavior of a tire.

The pneumatic trail of a tire is the trail-like effect generated by resilient material tires rolling on a hard surface and subject to side loads, as in a turn. The pneumatic trail parameter of a tire describes the distance where the resultant force of a tire sideslip occurs behind the geometric center of the contact patch of the tire.

Slip angle or sideslip angle, denoted a herein, is the angle between a rolling wheel's actual direction of travel and the direction towards which it is pointing (i.e., the angle of the vector sum of the wheel translational velocity.

The relaxation length of a tire is a property of a pneumatic tire that describes the delay between when a slip angle is introduced and when the cornering force reaches its steady state value. Normally, relaxation length is defined as the rolling distance needed by the tire to reach 63% of the steady state lateral force, although other definitions are also possible.

Vertical stiffness, or spring rate, is the ratio of vertical force to vertical deflection of the tire, and it contributes to the overall suspension performance of the vehicle. In general, spring rate increases with inflation pressure.

The contact patch, or footprint, of the tire, is the area of the tread that is in contact with the road surface. This area transmits forces between the tire and the road via friction. The length-to-width ratio of the contact patch affects steering and cornering behavior. The tire tread and sidewall elements undergo deformation and recovery as they enter and exit the footprint. Since the rubber is elastomeric, it is deformed during this cycle. As the rubber deforms and recovers, it imparts cyclical forces into the vehicle. These variations are collectively referred to as tire uniformity. Tire uniformity is characterized by radial force variation (RFV), lateral force variation (LFV) and tangential force variation. Radial and lateral force variation is measured on a force variation machine at the end of the manufacturing process. Tires outside the specified limits for RFV and LFV are rejected. Geometric parameters, including radial runout, lateral runout, and sidewall bulge, are measured using a tire uniformity machine at the tire factory at the end of the manufacturing process as a quality check.

The cornering force or side force of a tire is the lateral (i.e. parallel to the road surface) force produced by a vehicle tire during cornering.

Rolling resistance is the resistance to rolling caused by deformation of the tire in contact with the road surface. As the tire rolls, tread enters the contact area and is deformed flat to conform to the roadway. The energy required to make the deformation depends on the inflation pressure, rotating speed, and numerous physical properties of the tire structure, such as spring force and stiffness. Tire makers often seek lower rolling resistance tire constructions to improve fuel economy in trucks, where rolling resistance accounts for a high proportion of fuel consumption.

Ride comfort relates to the general experience of the driver or a passenger when riding in a vehicle. The ride comfort is dependent on the behavior of the vehicle, which in turn depends on the properties of the tires.

Self-aligning torque (SAT) is the torque that a tire creates as it rolls along that tends to steer it, i.e. rotate it around its vertical axis.

A tire model can be used to describe the properties of a given tire, such as those above and also other properties. For instance, a tire model can be used to define a relationship between longitudinal tire force Fx for a given wheel and an equivalent longitudinal wheel slip for the wheel. Longitudinal wheel slip $\lambda_x$ relates to a difference between wheel rotational velocity and speed over ground and will be discussed in more detail below. Wheel rotation speed $\omega$ is a rotational speed of the wheel, given in units of, e.g., rotations per minute (rpm) or angular velocity in terms radians/second (rad/sec) or degrees/second (deg/sec). The wheel behavior in terms of wheel force generated in longitudinal direction (in the rolling direction) and/or lateral direction (orthogonal to the longitudinal direction) as function of wheel slip is discussed in "Tyre and vehicle dynamics", Elsevier Ltd. 2012, ISBN 978-0-08-097016-5, by Hans Pacejka. See, e.g., chapter 7 where the relationship between wheel slip and longitudinal force is discussed.

Longitudinal wheel slip $\lambda_x$ may, in accordance with SAE J670 (SAE Vehicle Dynamics Standards Committee Jan. 24, 2008) be defined as $$\lambda_x = \frac{R\omega_x - v_x}{\max(|R\omega|, |v_x|)}$$

where R is an effective wheel radius in meters, $\omega_x$ is the angular velocity of the wheel, and $v_x$ is the longitudinal speed of the wheel (in the coordinate system of the wheel). Thus, $\lambda_x$ is bounded between −1 and 1 and quantifies how much the wheel is slipping with respect to the road surface. Wheel slip is, in essence, a speed difference measured between the wheel and the vehicle. Thus, the herein disclosed techniques can be adapted for use with any type of wheel slip definition. It is also appreciated that a wheel slip value is equivalent to a wheel speed value given a velocity of the wheel over the surface, in the coordinate system of the wheel.

The lateral slip of a tire is the angle between the direction it is moving and the direction it is pointing. Lateral slip can occur, for instance, in cornering, and is enabled by deformation in the tire structure and tread. Despite the name, no actual sliding is necessary for small slip angles. Lateral wheel slip is normally defined as $$\alpha = \arctan\left(\frac{v_y}{|v_x|}\right)$$

where $v_x$ is a longitudinal velocity component of the wheel motion, and $v_y$ is a lateral velocity component of the wheel motion. Lateral tire slip is discussed in detail in, e.g., “Tyre and vehicle dynamics”, Elsevier Ltd. 2012, ISBN 978-0-08-097016-5, by Hans Pacejka.

Lateral wheel slip $\lambda_y$ can optionally also be defined as $$\lambda_y = \frac{v_y}{\max(|R\omega|, |v_x|)}$$

where $v_y$ is the lateral speed of the wheel (in the coordinate system of the wheel), measured on a direction orthogonal to the direction of the longitudinal speed $v_x$.

Figure 2:
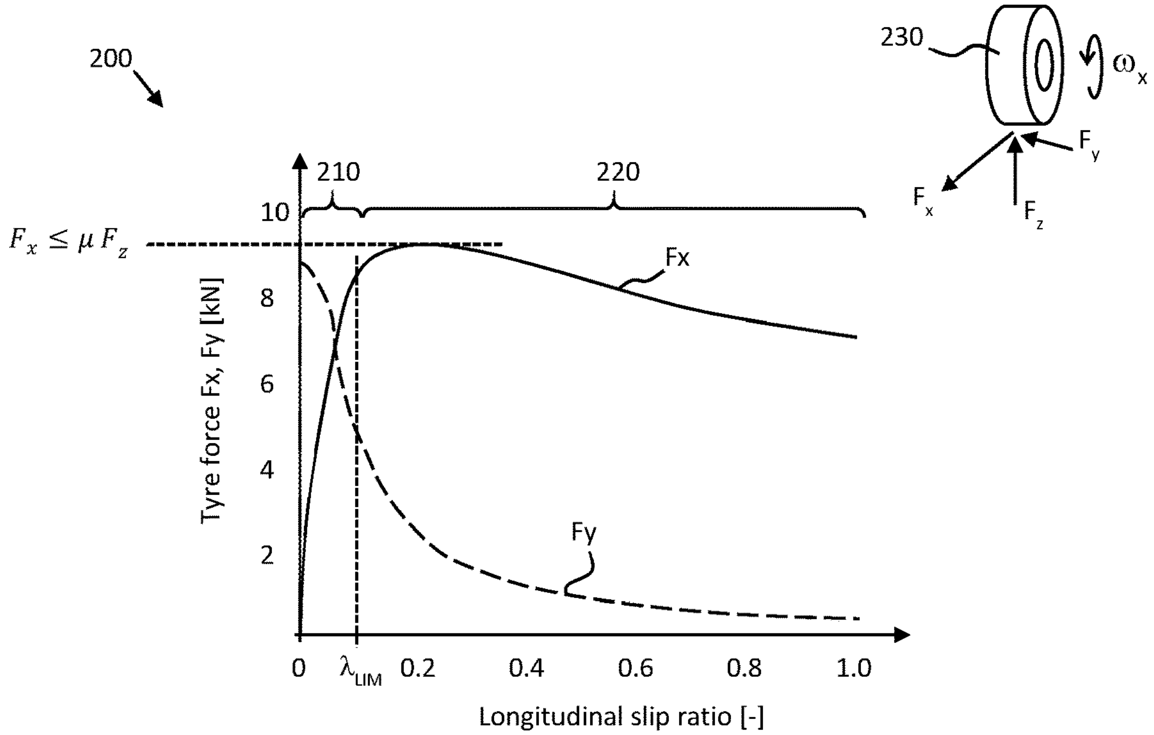
FIG. 2 is a graph showing an example of a tire model.

In order for a wheel (or tire) to produce a wheel force, slip must occur. For smaller slip values the relationship between slip and generated force are approximately linear, where the proportionality constant is often denoted as the slip stiffness of the tire. With reference to FIG. 2, a tire 230 (such as any of the tires 160, 170, 180) is subject to a longitudinal force $F_x$, a lateral force $F_y$, and a normal force $F_z$. The normal force $F_z$ is key to determining some important vehicle properties. For instance, the normal force to a large extent determines the achievable longitudinal tire force $F_x$ by the wheel since, normally, $F_x \leq \mu F_z$, where $\mu$ is a friction coefficient associated with a road friction condition. The maximum available lateral force for a given lateral slip can be described by the so-called Magic Formula as described in “Tyre and vehicle dynamics”, Elsevier Ltd. 2012, ISBN 978-0-08-097016-5, by Hans Pacejka.

FIG. 2 shows a graph 200 illustrating an example of achievable tire forces $F_x$, $F_y$ as function of wheel slip. The longitudinal tire force Fx shows an almost linearly increasing part 210 for small wheel slips, followed by a part 220 with more non-linear behavior for larger wheel slips. The obtainable lateral tire force Fy decreases rapidly even at relatively small longitudinal wheel slips. It is desirable to maintain vehicle operation in the linear region 210, where the obtainable longitudinal force in response to an applied brake command is easier to predict, and where enough lateral tire force can be generated if needed. To ensure operation in this region, a wheel slip limit $\lambda_{LIM}$ on the order of, e.g., 0.1, can be imposed on a given wheel. For larger wheel slips, e.g., exceeding 0.1, a more non-linear region 220 is seen.

The wheel forces can in the linear region be described by a stiffness both for longitudinal and lateral tire force, as $$F_x = C_x(w, F_z)\lambda_x$$

$$F_y = C_y(w, F_z)\alpha$$

where w is a parameter indicating tire wear, $\alpha$ is a slip angle of the tire, and where $C_x$ and $C_y$ are stiffness functions. The tire stiffnesses $C_x$ and $C_y$ normally increase with wear w and normal force $F_z$. Both functions above represent tire models which depend on tire parameters and vehicle state properties. Given a tire model such as the function $C_x(\cdot)\lambda_x$ and/or the function $C_y(\cdot)\alpha$ and input data related to the tire parameters w, $F_z$, it is possible for a VCU to obtain an accurate relationship between generated wheel force and wheel slip. This relationship will change in dependence of the tire parameters, i.e., the relationship will be a dynamic relationship which is updated over time as the tire wears and as the normal force $F_z$ of the tire changes.

A tire model of this kind can be determined by practical experimentation, analytical derivation, computer simulation, or a combination of the above. In practice, the tire model may be represented by a look-up table (LUT) indexed by the tire parameters, or as a set of coefficients describing a polynomial or the like. There the set of coefficients are selected based on the tire parameters, and where the polynomial then describes the relationship between tire behavior and vehicle state.

Other tire models of interest may instead or as a complement model a tire wear rate in dependence of, e.g., vehicle speed and normal load, and/or a tire rolling resistance for a given vehicle state, which rolling resistance then depends on the particular tire parameters of the tire currently mounted on a given wheel.

Figures 3, 4:
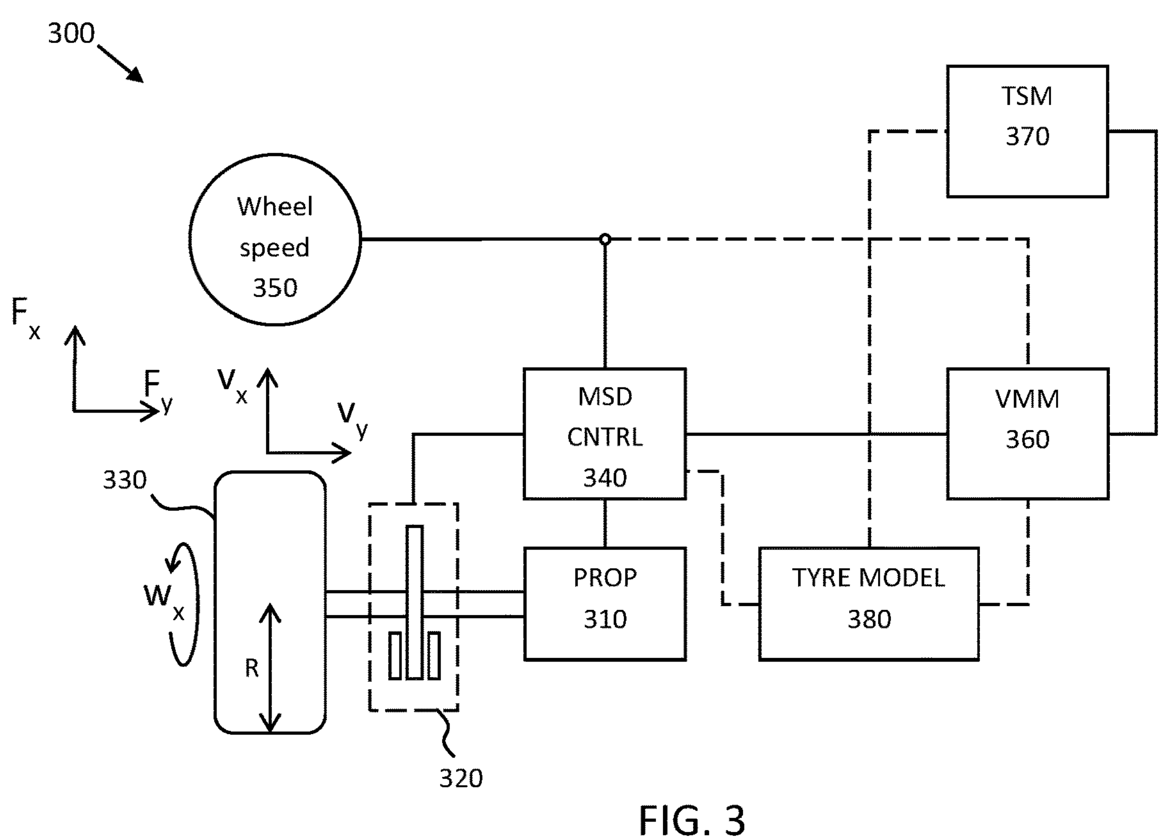
FIG. 3 is a block diagram illustrating motion support device control.
FIG. 4 shows a control architecture for controlling a vehicle.

FIG. 3 schematically illustrates functionality 300 for controlling a wheel 330 by some example MSDs here comprising a friction brake 320 (such as a disc brake or a drum brake) and a propulsion device 310 (such as an electric machine or a combustion engine). The friction brake 320 and the propulsion device 310 are examples of wheel torque generating devices, which may also be referred to as actuators and which can be controlled by one or more motion support device control units 340. The control is based on, e.g., measurement data obtained from a wheel rotation speed sensor 350 and from other vehicle state sensors, such as radar sensors, lidar sensors, and also vision based sensors such as camera sensors and infra-red detectors. Other example torque generating motion support devices which may be controlled according to the principles discussed herein comprise engine retarders and power steering devices. An MSD control unit 340 may be arranged to control one or more actuators. For instance, it is not uncommon that an MSD control unit is arranged to control MSDs for both wheels of an axle. By estimating vehicle unit motion using, e.g., global positioning systems, vision-based sensors, wheel rotation speed sensors, radar sensors and/or lidar sensors, and translating this vehicle unit motion into a local coordinate system of a given wheel (in terms of, e.g., longitudinal and lateral velocity components), it becomes possible to accurately estimate wheel slip in real time by comparing the vehicle unit motion in the wheel reference coordinate system to data obtained from the wheel rotation speed sensor 350 arranged in connection to the wheel.

Both the friction brake 320 and the propulsion device interacts with the road surface via a wheel 330 comprising a tire. Thus, the tire properties and behavioral characteristics has an impact on how the different control actions by the friction brake 320 and the propulsion device 310 generate vehicle motion. A software-based tire model 380 is comprised in the system. This tire model provides information about the tire currently mounted on the wheel 330, its properties, and behavioral characteristics. The VMM 360 and/or the MSD control unit 340 uses the information provided by the tire model to predict consequences of different control allocations. This means that the VMM and/or the MSD control unit can optimize control actions in dependence of the particular characteristics and properties of the tire.

According to a first example, the VMM 360 uses input from the tire model in order to predict a generated wheel force as a function of wheel slip. The prediction function, i.e., the mapping between slip and force is determined by the current tire parameters such as tire slip stiffness properties, tire thread area temperature, tire nominal inflation pressure, current tire normal force, wheel rotation speed, tire wear, and road friction coefficient.

According to a second example, the tire model is configured to predict a tire wear rate of the tire in g/km or g/s for an upcoming maneuver, where again the mapping between tire wear rate and vehicle state is determined by the current tire parameters. This allows the VMM function 360 to choose between different control options which all fulfill a desired global force generation, but which may be associated with significant different in tire wear rate.

According to a third example, the tire model is configured to predict a tire rolling resistance of the tire for an upcoming maneuver, vehicle state and vehicle configuration. This allows the VMM function 360 to choose between different control options and vehicle configurations which all fulfill a desired global force generation, but which may be associated with significant differences in tire rolling resistance. Thus, the VMM function may, e.g., decide that it is beneficial in terms of both rolling resistance and tire wear rate if a liftable axle is raised from the ground in a given driving scenario.

According to a fourth example, the tire model is configured to predict a ride comfort metric of the vehicle for an upcoming maneuver, based on the response and behavior of the tires during the maneuver, as predicted by the tire model. This again allows the VMM function 360 to choose between different control options and strategies for completing the maneuver in a safe and efficient manner with a secondary objective which reflects the ride comfort. Thus, the VMM function 360 may control the vehicle to operate at a higher ride comfort level compared to previous vehicles.

The tire model may, as mention above, be implemented as a look-up table or other type of function. The tire model is parameterized, i.e., defined, by one or more tire parameters. This means that the function itself varies in dependence of the tire properties. The tire model can be used to model various relationships, as exemplified above, such as a relationship or mapping between wheel slip and generated wheel force, and/or a mapping between tire wear rate and vehicle state such as tire normal load, vehicle speed, and wheel slip. It is appreciated that the present disclosure is not limited to any particular form of tire model structure. Rather, it is appreciated that many different types of mathematical and/or experimentally based functions and mappings can be used as the tire model.

Figure 5:
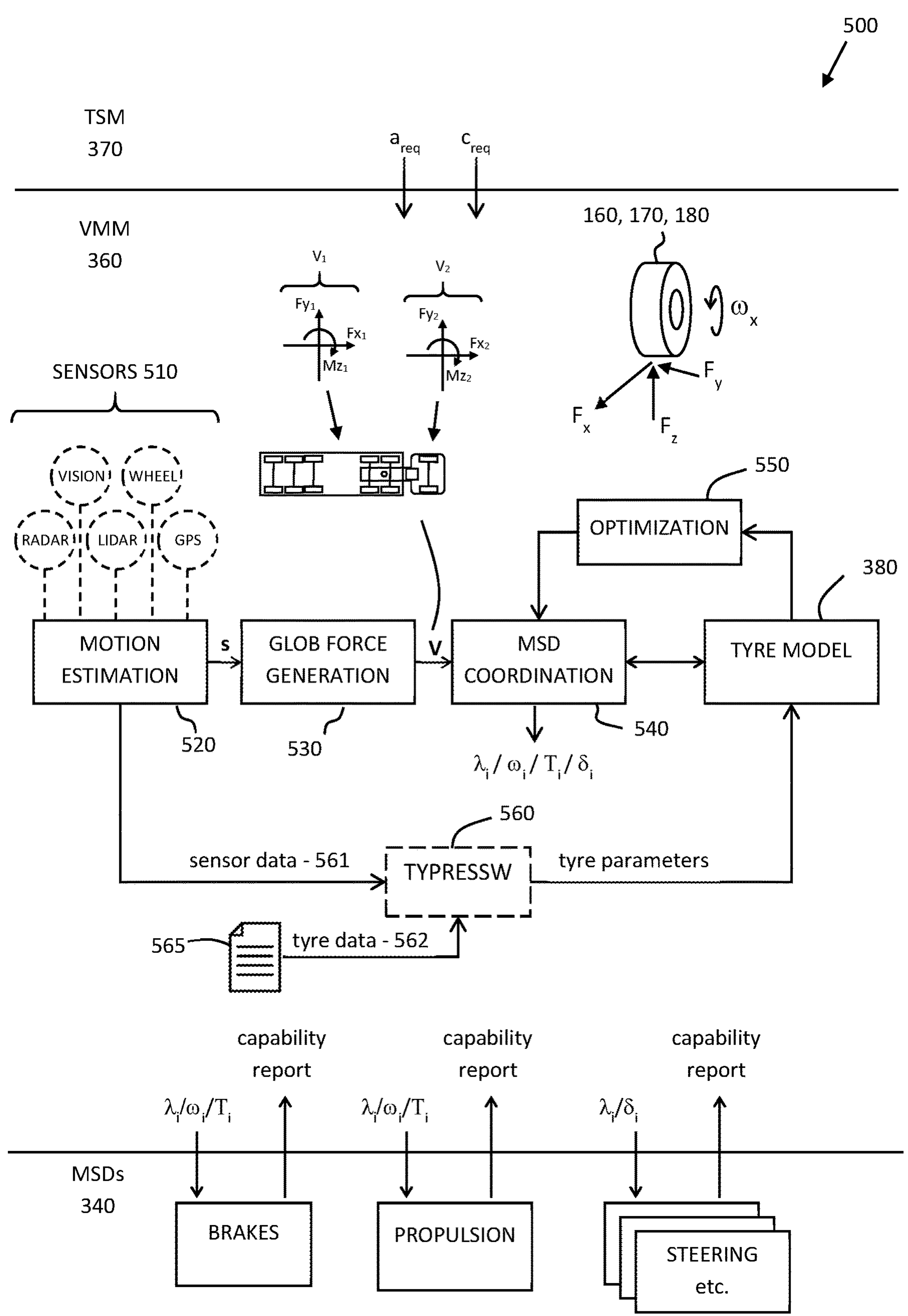
FIG. 5 illustrates an example vehicle motion support device control system.

With reference also to FIG. 4 and FIG. 5, a traffic situation management (TSM) function 370 plans driving operations with a time horizon of, e.g., 1-10 seconds or so. This time frame corresponds to, e.g., the time it takes for the vehicle 100 to negotiate a curve. The vehicle maneuvers, planned and executed by the TSM, can be associated with acceleration profiles and curvature profiles which describe a desired vehicle velocity and turning for a given maneuver. The TSM continuously requests the desired acceleration profiles $a_{req}$ and curvature profiles $c_{req}$ from the VMM function 360 which performs force allocation to meet the requests from the TSM in a safe and robust manner. The TSM function 370 may also base the determination of vehicle maneuver on the tire model 380, as indicated in FIG. 3. For instance, the TSM function 370 may compare two or more different maneuvers which accomplish the same objective in terms of, e.g., tire wear and/or rolling resistance, and then select the one which is most favorable in these respects.

Desired acceleration profiles and curvature profiles may optionally be determined based on input from a driver via a human machine interface 440 of the heavy-duty vehicle via normal control input devices such as a steering wheel, accelerator pedal and brake pedal, although the techniques disclosed herein are just as applicable with autonomous or semi-autonomous vehicles. The exact methods used for determining the acceleration profiles and curvature profiles is not within scope of the present disclosure and will therefore not be discussed in more detail herein. Notably, the traffic situation management and/or the transport mission and route planning function 420 may configure various properties of the vehicle, such as raising and lowering a liftable axle, adjusting suspensions, and so on.

Sensors arranged to provide data about the vehicle environment 430 provides input to the overall control stack 400, and a connection to remote processing resources, such as cloud-based processing resources 410 are also optionally comprised in the control stack. The remote server 150 in FIG. 1 may be comprised in this type of cloud layer 410.

The VMM function 360 operates with a time horizon of about 0.1-1.5 seconds or so, and continuously transforms the acceleration profiles $a_{req}$ and curvature profiles $c_{req}$ into control commands for controlling vehicle motion functions, actuated by the different MSDs of the vehicle 100 which report back capabilities to the VMM, which in turn are used as constraints in the vehicle control. The accuracy of this control is improved by means of the advanced tire models 380 discussed herein.

With reference mainly to FIG. 5, the VMM function 360 performs vehicle state or motion estimation 520, i.e., the VMM function 360 continuously determines a vehicle state s (often a vector variable) comprising positions, speeds, accelerations, yaw motions, normal forces and articulation angles of the different units in the vehicle combination by monitoring vehicle state and behavior using various sensors 510 arranged on the vehicle 100, often but not always in connection to the MSDs.

The result of the motion estimation 520, i.e., the estimated vehicle state s, is input to a global force generation module 530 which determines the required global forces on the vehicle units which need to be generated in order to meet the motion requests from the TSM 370. An MSD coordination function 540 allocates, e.g., wheel forces and coordinates other MSDs such as steering and suspension. The coordinated MSDs then together provide the desired lateral Fy and longitudinal Fx forces on the vehicle units, as well as the required moments Mz, to obtain the desired motion by the vehicle combination 100. As indicated in FIG. 5, the MSD coordination function 540 may output any of wheel slips $\lambda_i$, wheel rotation speeds $\omega$, torques $T_i$ and/or steering angles $\delta_I$ to the different MSDs.

The MSD coordination function 540 is supported by a tire model function 380 which may continuously update software-based models of the tires on the vehicle. The MSD coordination function 540 may, for instance, use the tire model to determine a relationship between wheel slip and generated wheel force as discussed in connection to FIG. 2. Also, according to another example, the MSD coordination function may decide on a number of different control options and/or different MSD coordination solutions which all meet a current request from the TSM 370, and thereby also improve some secondary objective, like reducing a tire wear rate and/or improving energy efficiency of the transportation mission by reducing a rolling resistance. This selection and/or optimization can be performed by an optimization module 550. In other words, it is appreciated that there are often additional degrees of freedom available when performing the MSD coordination, meaning that a given set of global forces can often be obtained in many different ways. Each such MSD coordination solution can be evaluated based on the tire model 380, which may then yield a preference towards some particular solution that provides reduced tire wear and/or reduced rolling resistance.

The tire model is parameterized by one or more tire parameters, such as tire wear, tire normal load, tire slip stiffness, etc. These tire parameters may of course be preconfigured. However, additional advantages may be obtained if the tire parameters are estimated or otherwise determined based on tire data obtained from memory 565 or based on tire data obtained from one or more sensors 510. The tire parameters may be estimated or at least regularly updated by a tire parameter estimation software (TYPRESSW) module 560.

Generally, the vehicle control methods disclosed herein and the different example tire models 380 may be based on input signals comprising tire based sensors such as pressure sensors, thread wear sensors, temperature sensors, vibration sensors, rim-based sensors, and the like. The input signals may also comprise data obtained from other sensors arranged on the vehicle 100, such as wheel rotation speed sensors, radar sensors, lidar sensors, vibration sensors, acoustic sensors, and the like. The methods and tire models disclosed herein may also obtain and use information received via wireless link from a remote device, such as the remote server 150, as well as driver requests and various actuator states.

The input to the TYPRESSW module 560, and optionally also to the tire model 380 may comprise wheel speed $v_x$ relative to the road surface, wheel rotation speed $\omega_x$, tire acceleration, tire pressure, tire temperature, tire strain, tire GPS position and weather data, ambient temperature, rain classification (obtained from a rain sensor, and/or from wiper speed, etc.), normal load $F_z$, slip angle $\alpha$ and/or steered angle $\delta$, and applied torque (propulsion and/or braking torque).

Thus, it is understood that a vehicle control unit, such as the VCUs 130, 140 can be arranged to store a tire model 380 in memory, e.g., as a look-up table or mathematical function. The tire model is arranged to be stored in the memory as a function of the current operating condition and parameters of the tire. This means that the tire model can advantageously be adjusted in dependence of the operating condition and general state of the tire, which means that a more accurate model is obtained compared to one which does not account for the particulars of the tire. The model which is stored in memory can be determined analytically or experimentally based on the structural design particulars and chemical composition of the tire which is mounted on the wheel. Also, the control unit can be configured to access a set of different models which are selected depending on the current tire operating condition. One tire model can be tailored for high load driving, where normal forces are large, another tire model can be tailored for slippery road conditions where road friction is low, and so on. The selection of a model to use can be based on a pre-determined set of selection rules.

Thus, the model may be configured to take, e.g., normal force or road friction as input parameters, thereby obtaining the tire model in dependence of a current operating condition of the wheel. It is appreciated that many aspects of the operating conditions can be approximated by default operating condition parameters, while other aspects of the operating conditions can be roughly classified into a smaller number of classes. Thus, obtaining the tire model in dependence of a current operating condition of the wheel does not necessarily mean that a large number of different models need to be stored, or a complicated analytical function which is able to account for variation in operating condition with fine granularity. Rather, it may be enough with two or three different models which are selected depending on operating condition. For instance, one model to be used when the vehicle is heavily loaded and another model to be used otherwise. In all cases, a mapping between tire force and wheel slip changes in some way in dependence of the operating condition, which improves the precision of the mapping.

The tire model may also be implemented at least partly as an adaptive model configured to automatically or at least semi-automatically adapt to the current operating conditions of the vehicle. This can be achieved by constantly monitoring the response of a given wheel in terms of wheel force generated in response to a given wheel slip request, and/or monitoring the response of the vehicle 100 in response to the wheel slip requests. The adaptive model can then be adjusted to more accurately model the wheel forces obtained in response to a given wheel slip request from a wheel.

The outputs from the tire model 380 can optionally be grouped into two categories: current state estimates and model parameters. Current state estimates represent an estimate of instantaneous tire and wheel states. Model Parameters is a group of signals that cover the current estimated tire model 'coefficients', based on a shared common tire model definition. The tire model (or models) may be used by the VCU 130, 140 to predict, e.g., what forces, rolling radius, rolling resistance, and wear rate, that can be expected given the current tire state and vehicle motion characteristics.

The tire model may be adapted to model a large variety of tire parameters independently from each other or in combination, and capabilities in dependence of tire design, tire state, and vehicle motion state:

$$[F_{x,stat},F_{y,stat}]=f1(C_{x0},C_{y0},T_{s0},P_0,F_{z0},V_{x0},T_s,P,F_z,v_x,w,\lambda_x,\lambda_y/\alpha,\mu,s_c),$$

$$[\sigma_x,\sigma_y]=f2(\sigma_{x0},\sigma_{y0},T_{s0},P_0,F_{z0},v_{x0},T_s,P,F_z,w,\lambda_x,\lambda_y/\alpha,\mu,s_c),$$

$$R=f3(R_0,T_{s0},P_0,F_{z0},v_{x0},T_s,P,F_z,v_x,w),$$

$$M_{rr}=f4(T_{s0},P_0,F_{z0},v_{x0},X_M,T_s,P,F_z,v_x,w,\lambda_x,\lambda_y/\alpha,\mu,s_c),$$

$$\dot{w}=f5(T_{s0},P_0,F_{z0},v_{x0},X_M,T_s,P,F_z,v_x,w,\lambda_x,\lambda_y/\alpha,\mu,s_c),$$

where f1-f5 are functions which may be analytical functions, numerical approximations, or just look-up tables. In the above equations $F_{x,stat}$, $F_{y,stat}$ are the calculated steady state forces in long and lateral direction respectively, $\sigma_x$, $\sigma_y$ are the instant relaxation lengths in longitudinal and lateral direction respectively, $C_{x0}$, $C_{y0}$ are the longitudinal and lateral slip stiffness of the tire at nominal condition, $\sigma_{x,0}$, $\sigma_{y,0}$ are the longitudinal and lateral relaxation lengths at nom conditions, $T_{s,0}$ is instant structural tire tread area temperature, $T_s$ is the nominal structural tire tread area temperature, P is the instant inflation pressure, $P_0$ is the nominal inflation pressure, $F_z$ is the instant vertical load, $F_{z,0}$ is the nominal vertical load, $v_x$ is the actual longitudinal speed of the tire (over ground), $v_{x,0}$ is a nominal longitudinal speed, w is the wear (0 to 100%), 0% corresponds to new conditions, $\sigma_x$, $\sigma_y$ are the instant relaxation lengths in longitudinal and lateral direction respectively, $\lambda_x$, $\lambda_y$ are the instant slip values, $\mu$ is the instant friction estimate, $s_c$ is and instant discrete state surface condition, R is the calculated instant (free) rolling radius, $R_0$ is the (free) rolling radius under nominal conditions, $M_{rr}$ is the calculated torque from rolling resistance, and $\dot{w}$ is the wear rate of the tire in g/km or g/s.

It is appreciated that the equations can also be re-phrased to depend on different definitions of lateral slip, e.g., $\alpha$ or $\lambda_y$ as discussed above.

Dynamic (instant) forces can also be derived. At least two alternative ways are possible, either relaxing the calculated static forces, or applying the static force formulas on calculated relaxed slip angles ($s_{i,dyn}$), by replacing $\lambda_x$, $\lambda_y$ in the formulas above with $\lambda_{x\text{-}dyn}$, $\lambda_{y\text{-}dyn}$.

$$F_{i,dyn}=\frac{1}{\sigma_i}\int(F_{i,stat}-F_{i,dyn})\cdot v_x\ dt$$

$$\lambda_{i,dyn}=\frac{1}{\sigma_i}\int(\lambda_i-\lambda_{i,dyn})\cdot v_x\ dt$$

where i is either x or y, i.e., longitudinal or lateral direction.

Figures 6A, 6B:
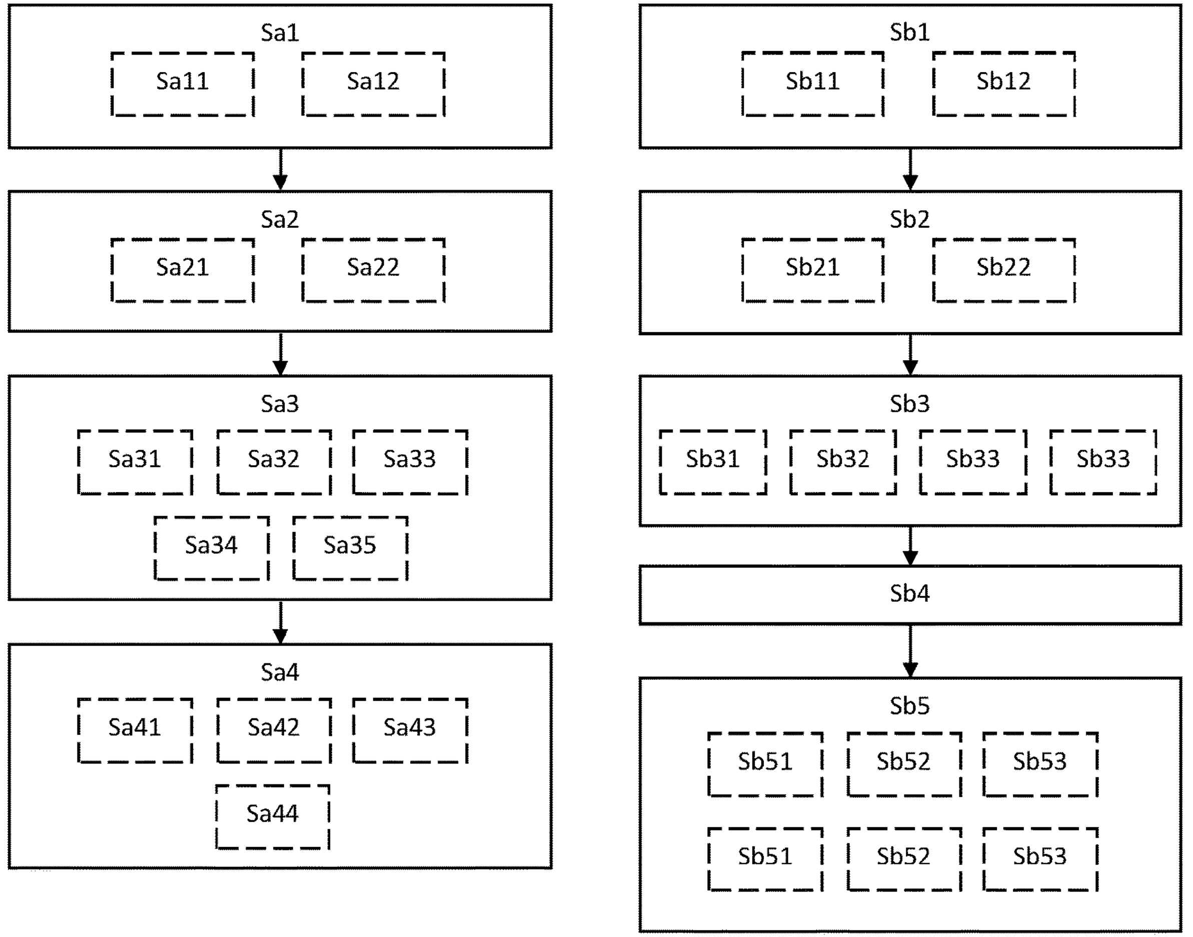

FIGS. 6A-C are flow charts which summarize and exemplify the discussions above. The methods may be performed by a VCU 130, 140 in the vehicle 100, or at least in part by the remote server 150. This VCU may be implemented in a central processing unit or distributed over several units.

With reference also to FIG. 5, FIG. 6A shows a method for controlling motion of a heavy-duty vehicle 100. The method comprises obtaining Sa1 input data 561, 562 related to one or more parameters of a tire 150, 160, 170 on the heavy-duty vehicle 100. The input data Sa12 optionally comprises data, obtained from a memory device 565, related to tire design. The input data may comprise configuration data 562 relating, e.g., a tire brand and/or model, a chemical composition of the tire, tire nominal dimensions, or other structural and mechanical characteristics and features of the tire. Optionally, the data related to tire design also comprises tire history indicating if the tire has been subject to any treatment or events which may have changed the behavior of the tire. For instance, a tire may have been subject to re-treading and/or may have been serviced in a manner which may affect its behavioral characteristics. The input data may furthermore comprise data 561 from one or more sensors 510, both sensors arranged in connection to the actual tire and/or sensors arranged on the vehicle 100. These optional sensors 510 are arranged to measure one or more operating parameters of the tire, where the one or more operating parameters may comprise any of: vehicle speed, wheel rotation speed, tire pressure, tire temperature, tire acceleration, tire strain, tire GPS position, weather, ambient temperature, rain classification data, normal load, slip angle, steer angle, and applied positive/negative torque to the tire.

The method also comprises determining Sa2 at least part of the one or more tire parameters based on the input data. Some of the parameters may be directly determined. For instance, a nominal tire pressure may be directly given from a pressure sensor arranged to measure tire pressure. Other parameters of the tire may be estimated based on the input data. For instance, an effective tire rolling radius may be determined from a combination of nominal tire dimension, tire pressure and tire rotational speed. Tire wear may be estimated by integrating an estimated tire wear rate, or simply based on tire age. The one or more estimated tire parameters Sa21 optionally comprise any of: tire wear, tire longitudinal stiffness, tire lateral stiffness, tire rolling resistance, tire peak friction, tire rolling radius, tire contact patch properties, tire balance properties and wheel alignment properties.

A tire model is then configured Sa3, where the tire model defines a relationship between wheel slip and generated wheel force, e.g., as discussed above in connection to FIG. 2. This tire model is then parameterized by the one or more tire parameters. For instance, to give a straight-forward example, the tire model may comprise just a linear approximation of the relationship between wheel slip and generated force determined from the slip stiffness parameter of the tire. As mentioned above, one key concept of the techniques disclosed herein is that the tire models and the different estimated and measured tire parameters may be repeatedly updated Sa22 based on updated input data. This means that the tire models and various tire parameters will be kept up to date as the tire progresses through its life cycle, from a new tire to a tire which is almost worn out and in need of replacement. Consequently, the tire model will be more accurate compared to a tire model which is fixedly configured. Also, the tire model will react to misconfiguration, and remove any discrepancy between pre-configured data and actual behavior of the tire.

According to some aspects, the tire model Sa31 is configured to define a relationship between wheel slip and generated wheel force in longitudinal and lateral directions, as was discussed above in connection to FIG. 2. The VMM function of the vehicle 100 may advantageously use this tire model to perform MSD coordination in order to generate a desired global force distribution over the different vehicle units of a heavy-duty articulated vehicle in a more precise manner. For instance, in case an acceleration is desired, the VMM function may coordinate MSDs to generate wheel slips which together provide the desired force in the direction of the desired acceleration. The tire model Sa34 is optionally configured to define a relationship between wheel slip and both propulsion and braking wheel forces, or just one out of propulsion or braking.

According to other aspects, the tire model Sa32 is configured to model a rolling resistance of the tire. This means that the VMM function can compare different solutions to the MSD coordination problem in terms of rolling resistance and pick one which is associated with a smaller rolling resistance compared to the other solutions to the MSD coordination problem. Also, if the vehicle 100 comprises one or more liftable axles, then the VMM function may evaluate if lifting the axle would result in more favorable operation with respect to rolling resistance. This way the VMM function may optimize or at least improve vehicle control with the objective of attaining a lower rolling resistance. Consequently, the methods disclosed herein advantageously potentially provide a reduced overall rolling resistance of the vehicle 100.

According to further aspects, the tire model Sa33 is configured to model a wear rate of the tire, e.g., in dependence of vehicle state and/or maneuver. Thus, the various vehicle control functions may take tire wear rate into account. This means that one or more feasible solutions for generating a set of desired global forces by the different MSDs can be discarded since they result in excessive tire wear rate. This may, for instance, occur if the vehicle is cornering, where some control allocations result in heavy scrubbing. By incorporating a tire model comprising a tire wear rate output for different vehicle states and tire parameters, tire lifetime can be prolonged by avoiding vehicle maneuvers associated with high tire wear rate.

The tire model Sa35 may also be configured to model a self-aligning torque of the tire. This self-aligning torque is sometimes a component in the MSD coordination function. Thus, having a good idea about this important force simplifies performing accurate vehicle motion management.

The method also comprises controlling Sa4 the motion of the heavy-duty vehicle based on the relationship between wheel slip and generated wheel force. Examples of the controlling was discussed in connection to, e.g., FIGS. 3 and 4 above. For instance, the method may comprise coordinating Sa41 one or more motion support devices of the heavy-duty vehicle 100 to reduce a tire wear rate under constraints comprising fulfillment of a motion request. This means that the VMM function may have several possible solutions for how to generate a desired set of global forces and moments acting on the different vehicle units in the vehicle 100. Each solution can then be evaluated in terms of tire wear rate by the tire model, and one which does not result in excessive tire wear rate can be selected. This type of function may be used to constrain vehicle motion management to only pick control solutions associated with limited tire wear rates. The feature can also be used to provide warning signals to a driver when the driver performs vehicle controls which are associated with high tire wear rates. In this case, if the driver performs a maneuver which is harmful to the tires, a warning light or other notification means, such as an audible alarm signal, may be triggered in the cabin, and a message may be displayed informing the driver about the high tire wear rate currently generated.

The methods disclosed herein may furthermore comprise coordinating Sa42 one or more motion support devices of the heavy-duty vehicle 100 to reduce a tire rolling resistance under constraints comprising fulfillment of a motion request. Thus, as for the tire wear rate, the VMM function may select between different MSD coordination solutions which all generate a set of desired global forces and pick that which is associated with an acceptable or even a minimum rolling resistance. By consequently selecting control allocations which are associated with reduced rolling resistance, the energy efficiency of the vehicle 100 is improved, which is an advantage.

According to some aspects, the tire model can be used to estimate or predict a stopping distance of the vehicle. Thus, the methods disclosed herein optionally comprise coordinating Sa43 one or more motion support devices of the heavy-duty vehicle 100 to reduce a stopping distance of the heavy-duty vehicle 100. This coordination may comprise adjusting a liftable axle, and or generating a change in normal loads by, e.g., adjustable suspension systems or the like. This feature can be used to make further optimizations to, e.g., fuel economy or other forms of energy efficiency, which maintaining stopping distance below some maximum value.

The methods disclosed herein may also comprise coordinating Sa44 one or more motion support devices of the heavy-duty vehicle 100 to increase a travelled range capability of the heavy-duty vehicle 100.

It is appreciated that many of the functions and features disclosed herein may be implemented independently from each other or in combination. In particular, the features relating to tire wear rate estimation and tire rolling resistance estimation may be implemented independently of the features relating to tire force estimation, or in combination as a more advanced tire model able to output more than one form of output data.

FIG. 6B is a flow chart illustrating a method for controlling motion of a heavy-duty vehicle 100, and in particular for estimating wear rate of one or more tires on the vehicle in dependence of vehicle motion state. With reference also to, e.g., FIG. 5, the method comprises obtaining Sb1 input data 561, 562 related to one or more tire parameters of a tire 150, 160, 170 on the heavy-duty vehicle 100. The tire parameters which may be relevant for determining wear rate may comprise, e.g., tire chemical composition and mechanical structure, contact patch geometry, inflation pressure, and so on. The method also comprises estimating Sb2 at least part of the one or more tire parameters based on the input data. As mentioned above, the input data may either directly identify the tire parameter (for instance chemical composition which can be obtained from data stored in memory), or indirectly be associated with a tire parameter. Sensor data can be used to estimate, e.g., the current tire contact patch geometry.

Generally, the one or more tire parameters may comprise any of tire pressure, tire temperature, tire strain, tire GPS position, weather, ambient temperature, and rain classification data. The data related to tire design optionally comprises any of tire nominal dimension, tire structural characteristics, tire chemical composition, and tire history.

The method also comprises configuring Sb3 a tire model, where the tire model defines a relationship between tire wear rate and vehicle motion state, and where the tire model is parameterized by the one or more tire parameters. Thus, given a certain tire model structure, the tire model is first adjusted to fit a given tire mounted to the vehicle, i.e., it is parameterized. It is appreciated that different tires on a vehicle are likely to be associated with different tire model parameterizations, even if the tires fitted to the different wheels of the vehicle are of the same brand and type, they are likely to be subject to different operating conditions and will therefore likely have different tire model parameterizations. The tire model defines a relationship between current or future vehicle motion state and tire wear rate. This means that the tire model can be seen as a function or mapping between vehicle motion state and tire wear rate.

Generally, vehicle motion state may comprise any of vehicle speed, wheel rotation speed, tire acceleration, tire normal load, slip angle, steer angle, and applied torque. The vehicle motion state optionally also comprises any of longitudinal wheel slip of a respective wheel of the tire Sb31, lateral wheel slip of the respective wheel of the tire Sb32, a normal load of the respective wheel of the tire Sb33, and a rotational velocity of the respective wheel of the tire Sb34.

The method furthermore comprises estimating vehicle motion state Sb4, and also controlling Sb5 motion of the heavy-duty vehicle based on the tire model and on the vehicle motion state. The tire model can be used for various vehicle control functions. For instance, if it is desired to reduce tire wear on a given vehicle, different control options or MSD coordination solutions can be compared in terms of tire wear rate, and the control option with acceptable or even minimum tire wear rate can be selected. Vehicle configuration can also be determined with objective to reduce tire wear rate. For instance, suppose that the vehicle comprises one or more liftable axles, or an active suspension system which allows the VCU to adjust normal load on the different axles or even for individual tires. In this case a normal load distribution resulting in reduced tire wear can be selected in favor of configurations which result in higher degrees of tire wear. Thus, tire wear on the vehicle 100 can be reduced, which is an advantage.

According to aspects, the one or more estimated tire parameters Sb21 comprise any of: tire wear, tire longitudinal stiffness, tire lateral stiffness, tire rolling resistance, tire peak friction, tire rolling radius, tire contact patch properties, tire balance properties and wheel alignment properties. These tire parameters can be used to "customize" the tire model to fit a given tire. This tire model will then provide a more accurate mapping between vehicle operating condition and tire wear rate, compared to a more general tire model which is not customized to fit a given tire. It is an advantage that the tire models proposed herein may be repeatedly updated Sb22, for at least part of the one or more tire parameters based on the input data. Thus, if the tire properties change over time, so will the model in order to maintain an accurate mapping between vehicle operating condition and wear rate of the tire.

Many different examples exist of how vehicle control can be adapted to account for tire wear rate, as given by the tire model in dependence of the vehicle operating state. Tire wear rate can either be determined for a current vehicle state, i.e., how much the current vehicle state affects the tire in terms of tire wear or predicted for a future vehicle operation. For instance, suppose that the vehicle is approaching a turn and where there are several different options for negotiating the turn, i.e., steer by braking, steering by a steered axle, or a combination of the two. The vehicle may also be able to choose a path through the curve. The tire model can then be consulted in order to determine the tire wear associated with the different control options, and the options associated with the smallest tire wear rate can be selected. It is appreciated that, if the tire model also is configured to output data related to, e.g., rolling resistance, then a combination of the two selection criteria can be used, in order to find a control option which has a reasonable amount of tire wear and at the same time provides an acceptable degree of rolling resistance.

Advantageously, a wheel slip limit for vehicle motion control can be configured in dependence of a pre-determined acceptable target wear rate. Thus, as long as the vehicle is not experiencing a hazardous situation, the tire wear can be significantly reduced by operating the vehicle at or below this wheel slip limit.

The method optionally also comprises any of controlling Sb51 wheel slip in dependence of the wear rate corresponding to the vehicle motion state, controlling Sb52 normal load in dependence of the wear rate corresponding to the vehicle motion state, e.g., by adjusting a setting of a liftable axle of the vehicle in dependence of the wear rate and/or a setting of an active suspension system. The method also optionally comprises any of controlling bS53 wheel rotational velocity in dependence of the wear rate, controlling Sb54 motion of the heavy-duty vehicle based on a configured target wear rate, and coordinating Sb55 one or more motion support devices of the heavy-duty vehicle 100 to reduce a tire wear rate under constraints comprising fulfillment of a motion request.

The vehicle control may furthermore be performed under a requirement of a maximum or at least preferred stopping distance, i.e., the vehicle may need to be required to be able to come to a full stop in a specified distance. In this case the method may comprise coordinating Sb56 one or more motion support devices of the heavy-duty vehicle 100 to reduce a stopping distance of the heavy-duty vehicle 100.

FIG. 6C is a flow chart illustrating a method for controlling motion of a heavy-duty vehicle 100, and in particular for estimating rolling resistance of one or more tires on the vehicle in dependence of vehicle motion state. With reference also to, e.g., FIG. 5, the method comprises obtaining Sc1 input data 561, 562 related to one or more tire parameters of a tire 150, 160, 170 on the heavy-duty vehicle 100. The tire parameters which may be relevant for determining rolling resistance may comprise, e.g., tire chemical composition and mechanical structure, contact patch geometry, inflation pressure, and so on. The method also comprises estimating Sc2 at least part of the one or more tire parameters based on the input data. As mentioned above, the input data may either directly identify the tire parameter (for instance chemical composition which can be obtained from data stored in memory), or indirectly be associated with a tire parameter. Sensor data can be used to estimate, e.g., the current tire contact patch geometry, current inflation pressure, etc.

Generally, the one or more tire parameters may comprise any of tire pressure, tire temperature, tire strain, tire GPS position, weather, ambient temperature, and rain classification data.

The data related to tire design optionally comprises any of tire nominal dimension, tire structural characteristics, tire chemical composition, and tire history.

The method also comprises configuring Sc3 a tire model, where the tire model defines a relationship between tire rolling resistance and vehicle motion state, and where the tire model is parameterized by the one or more tire parameters. Thus, given a certain tire model structure, the tire model is first adjusted to fit a given tire mounted to the vehicle, i.e., it is parameterized. It is appreciated that different tires on a vehicle are likely to be associated with different tire model parameterizations, even if the tires fitted to the different wheels of the vehicle are of the same brand and type, they are likely to be subject to different operating conditions and will therefore likely have different tire model parameterizations. The tire model defines a relationship between current or future vehicle motion state and tire rolling resistance. This means that the tire model can be seen as a function or mapping between vehicle motion state and tire rolling resistance.

Generally, vehicle motion state may comprise any of vehicle speed, wheel rotation speed, tire acceleration, tire normal load, slip angle, steer angle, and applied torque.

The vehicle motion state optionally also comprises any of longitudinal wheel slip of a respective wheel of the tire Sc31, lateral wheel slip of the respective wheel of the tire Sc32, a normal load of the respective wheel of the tire Sc33, and a rotational velocity of the respective wheel of the tire Sc34.

The method furthermore comprises estimating vehicle motion state Sc4, and also controlling Sc5 motion of the heavy-duty vehicle based on the tire model and on the vehicle motion state. The tire model can be used for various vehicle control functions. For instance, if it is desired to reduce tire wear on a given vehicle, different control options or MSD coordination solutions can be compared in terms of tire rolling resistance, and the control option with acceptable or even minimum tire rolling resistance can be selected. Vehicle configuration can also be determined with objective to reduce tire rolling resistance. For instance, suppose that the vehicle comprises one or more liftable axles, or an active suspension system which allows the VCU to adjust normal load on the different axles or even for individual tires. In this case a normal load distribution resulting in reduced tire wear can be selected in favor of configurations which result in higher degrees of tire wear. Thus, tire wear on the vehicle 100 can be reduced, which is an advantage.

According to aspects, the one or more estimated tire parameters Sc21 comprise any of: tire wear, tire longitudinal stiffness, tire lateral stiffness, tire rolling resistance, tire peak friction, tire rolling radius, tire contact patch properties, tire balance properties and wheel alignment properties. These tire parameters can be used to "customize" the tire model to fit a given tire. This tire model will then provide a more accurate mapping between vehicle operating condition and tire rolling resistance, compared to a more general tire model which is not customized to fit a given tire. It is an advantage that the tire models proposed herein may be repeatedly updated Sc22, for at least part of the one or more tire parameters based on the input data. Thus, if the tire properties change over time, so will the model in order to maintain an accurate mapping between vehicle operating condition and rolling resistance of the tire.

Many different examples exist of how vehicle control can be adapted to account for tire rolling resistance, as given by the tire model in dependence of the vehicle operating state. Tire rolling resistance can either be determined for a current vehicle state, i.e., how much the current vehicle state affects the tire in terms of tire wear or predicted for a future vehicle operation. For instance, suppose that the vehicle is approaching a turn and where there are several different options for negotiating the turn, i.e., steer by braking, steering by a steered axle, or a combination of the two. The tire model can then be consulted in order to determine the tire wear associated with the different control options, and the options associated with the smallest tire rolling resistance can be selected. It is appreciated that, if the tire model also is configured to output data related to, e.g., rolling resistance, then a combination of the two selection criteria can be used, in order to find a control option which has a reasonable amount of tire wear and at the same time provides an acceptable degree of rolling resistance.

The method optionally comprises any of controlling Sc51 wheel slip in dependence of the rolling resistance corresponding to the vehicle motion state, controlling Sc52 normal load in dependence of the rolling resistance corresponding to the vehicle motion state, e.g., by adjusting a setting of a liftable axle of the vehicle in dependence of the rolling resistance and/or a setting of an active suspension system. The method also optionally comprises any of controlling bS53 wheel rotational velocity in dependence of the rolling resistance, controlling Sc54 motion of the heavy-duty vehicle based on a configured target rolling resistance, and coordinating Sc55 one or more motion support devices of the heavy-duty vehicle 100 to reduce a tire rolling resistance under constraints comprising fulfillment of a motion request.

The vehicle control may furthermore be performed under a requirement of a maximum or at least preferred stopping distance, i.e., the vehicle may need to be required to be able to come to a full stop in a specified distance. In this case the method may comprise coordinating Sc56 one or more motion support devices of the heavy-duty vehicle 100 to reduce a stopping distance of the heavy-duty vehicle 100.

It is appreciated that the methods steps discussed above in connection to FIGS. 6A-C can be freely combined.

FIG. 7 schematically illustrates, in terms of a number of functional units, the components of a control unit 700 according to embodiments of the discussions herein, such as any of the VUCs 130, 140. This control unit 700 may be comprised in the articulated vehicle 1. Processing circuitry 710 is provided using any combination of one or more of a suitable central processing unit CPU, multiprocessor, microcontroller, digital signal processor DSP, etc., capable of executing software instructions stored in a computer program product, e.g. in the form of a storage medium 730. The processing circuitry 710 may further be provided as at least one application specific integrated circuit ASIC, or field programmable gate array FPGA.

Particularly, the processing circuitry 710 is configured to cause the control unit 700 to perform a set of operations, or steps, such as the methods discussed in connection to FIG. 7. For example, the storage medium 730 may store the set of operations, and the processing circuitry 710 may be configured to retrieve the set of operations from the storage medium 730 to cause the control unit 700 to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The control unit 700 may further comprise an interface 720 for communications with at least one external device. As such the interface 720 may comprise one or more transmitters and receivers, comprising analogue and digital components and a suitable number of ports for wireline or wireless communication.

The processing circuitry 710 controls the general operation of the control unit 700, e.g., by sending data and control signals to the interface 720 and the storage medium 730, by receiving data and reports from the interface 720, and by retrieving data and instructions from the storage medium 730. Other components, as well as the related functionality, of the control node are omitted in order not to obscure the concepts presented herein.

FIG. 8 illustrates a computer readable medium 810 carrying a computer program comprising program code means 820 for performing the methods illustrated in FIGS. 6A-C, when said program product is run on a computer. The computer readable medium and the code means may together form a computer program product 800.

The invention claimed is:

1. A method for controlling motion of a heavy-duty vehicle, the method comprising:

obtaining input data related to one or more tire parameters on the heavy-duty vehicle, determining at least part of the one or more tire parameters based on the input data, configuring a tire model, wherein the tire model defines a relationship between wheel slip and generated wheel force, wherein the tire model is parameterized by the one or more tire parameters, and controlling the motion of the heavy-duty vehicle based on the relationship between the wheel slip and the generated wheel force by sending wheel slip requests from a vehicle motion management (VMM) function of the heavy-duty vehicle to one or more motion support device (MSD) control units of the heavy-duty vehicle.

2. The method according to claim 1, wherein the input data comprises input data from one or more sensors arranged to measure one or more operating parameters of the tire.

3. The method according to claim 2, wherein the one or more operating parameters comprise any of: vehicle speed, wheel rotation speed, tire pressure, tire temperature, tire acceleration, tire strain, tire GPS position, weather, ambient temperature, rain classification data, normal load, slip angle, steer angle, and applied torque.

4. The method according to claim 1, wherein:

the input data comprises data obtained from memory related to tire design; and the input data related to the tire design comprises any of tire nominal dimension, tire structural characteristics, tire chemical composition, and tire history.

5. The method according to claim 1, wherein the one or more tire parameters comprise any of: tire wear, tire longitudinal stiffness, tire lateral stiffness, tire rolling resistance, tire peak friction, tire rolling radius, tire contact patch properties, tire balance properties and wheel alignment properties.

6. The method according to claim 1, comprising repeatedly updating at least part of the one or more tire parameters based on updated input data.

7. The method according to claim 1, wherein the tire model is configured to define the relationship between the wheel slip and the generated wheel force in longitudinal and lateral directions.

8. The method according to claim 1, wherein the tire model is configured to model at least one of a rolling resistance of the tire and a wear rate of the tire.

9. The method according to claim 1, wherein the tire model is configured to define a relationship between the wheel slip and both propulsion and braking wheel forces.

10. The method according to claim 1, wherein the tire model is configured to model a self-aligning torque of the tire.

11. The method according to claim 1, further comprising coordinating one or more motion support devices of the heavy-duty vehicle to reduce a tire wear rate under constraints comprising fulfillment of a motion request.

12. The method according to claim 1, further comprising coordinating one or more motion support devices of the heavy-duty vehicle to reduce a tire rolling resistance under constraints comprising fulfillment of a motion request.

13. The method according to claim 1, further comprising coordinating one or more motion support devices of the heavy-duty vehicle to reduce a stopping distance of the heavy-duty vehicle.

14. The method according to claim 1, further comprising coordinating one or more motion support devices of the heavy-duty vehicle to increase a travelled range capability of the heavy-duty vehicle.

15. A computer program comprising program code configured for performing the steps of claim 1 when said program is run on a computer or on processing circuitry of a control unit.

16. A computer readable medium carrying a computer program comprising program code configured for performing the steps of claim 1 when said computer program is run on a computer or on processing circuitry of a control unit.

17. A control unit for determining an allowable vehicle state space of an articulated vehicle, the control unit being configured to perform the steps of the method according claim 1.

18. A vehicle comprising the control unit according to claim 17.

19. The method according to claim 1, wherein the wheel slip request is a request to execute steps to achieve a desired slip state during a propulsion or braking event.

20. The method according to claim 1, wherein, in response to receiving the wheel slip request, the one or more MSD control units calculate actions to satisfy the wheel slip request.

* * * * *